United States Patent
Oya et al.

(10) Patent No.: US 9,070,074 B2
(45) Date of Patent: Jun. 30, 2015

(54) IMAGE PROCESSING APPARATUS AND IMAGE PROCESSING METHOD

(75) Inventors: Masashi Oya, Soka (JP); Hiromitsu Nishikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/823,207

(22) PCT Filed: Oct. 7, 2011

(86) PCT No.: PCT/JP2011/073759
§ 371 (c)(1),
(2), (4) Date: Mar. 14, 2013

(87) PCT Pub. No.: WO2012/050218
PCT Pub. Date: Apr. 19, 2012

(65) Prior Publication Data
US 2013/0169984 A1   Jul. 4, 2013

(30) Foreign Application Priority Data

Oct. 14, 2010 (JP) ................................. 2010-231883
Sep. 28, 2011 (JP) ................................. 2011-213382

(51) Int. Cl.
*H04N 1/60*   (2006.01)
*G06K 15/02*   (2006.01)
(Continued)

(52) U.S. Cl.
CPC ........... *G06K 15/1867* (2013.01); *B41J 2/2114* (2013.01); *H04N 1/54* (2013.01); *B41J 2/175* (2013.01); *B41J 2/2056* (2013.01); *B41J 2/2107* (2013.01)

(58) Field of Classification Search
USPC ....................... 358/1.9; 347/9, 102, 14, 20, 85
See application file for complete search history.

(56) References Cited

U.S. PATENT DOCUMENTS 6,050,680 A * 4/2000 Moriyama et al. .............. 347/85
6,084,604 A   7/2000 Moriyama et al.
(Continued)

FOREIGN PATENT DOCUMENTS

CN   1090816 A   8/1994
JP   2003-132350 A   5/2003
(Continued)

OTHER PUBLICATIONS

Notification of Transmittal of the International Search Report and the Written Opinion of the International Searching Authority dated Nov. 22, 2011; a Written Opinion of the International Searching Authority; and an International Search Report.

(Continued)

*Primary Examiner* — Quang N Vo
(74) *Attorney, Agent, or Firm* — Fitzpatrick, Cella, Harper & Scinto

(57) ABSTRACT

An image processing apparatus for printing an image using a plurality of color materials and a colorless material includes a memory which stores information indicating a plurality of dot placements which include different dot placements of the colorless material and correspond to an amount of the colorless material, and an inputting unit configured to input color material amount data indicating amounts of the plurality of color materials and the amount of the colorless material for each pixel. In addition, a first determiner is configured to determine a dot placement of the colorless material from the plurality of dot placements based on the amount of the colorless material indicated by the input color material amount data, so that coloring of specular reflection light on the pixel becomes closer to an achromatic color. A printing unit is configured to print the colorless material on the color materials subsequent to the color materials having been printed, based on the determined dot placement.

5 Claims, 16 Drawing Sheets

(51) Int. Cl.
*B41J 2/21* (2006.01)
*H04N 1/54* (2006.01)
*B41J 2/175* (2006.01)
*B41J 2/205* (2006.01)
*G06F 15/00* (2006.01)

(56) References Cited

U.S. PATENT DOCUMENTS 7,224,360 B2 5/2007 Tatsumi
2003/0085894 A1 5/2003 Tatsumi
2006/0284929 A1* 12/2006 Matsuzawa et al. ............ 347/43

FOREIGN PATENT DOCUMENTS

| JP | 2004-181688 A | 7/2004 |
| JP | 2006-272934 A | 10/2006 |
| JP | 2008-143135 A | 6/2008 |
| JP | 2010-137471 A | 6/2010 |

OTHER PUBLICATIONS

Chinese Office Action issued in counterpart Chinese Application No. 201180049795.X, dated Jul. 28, 2014.

* cited by examiner

F I G. 3A
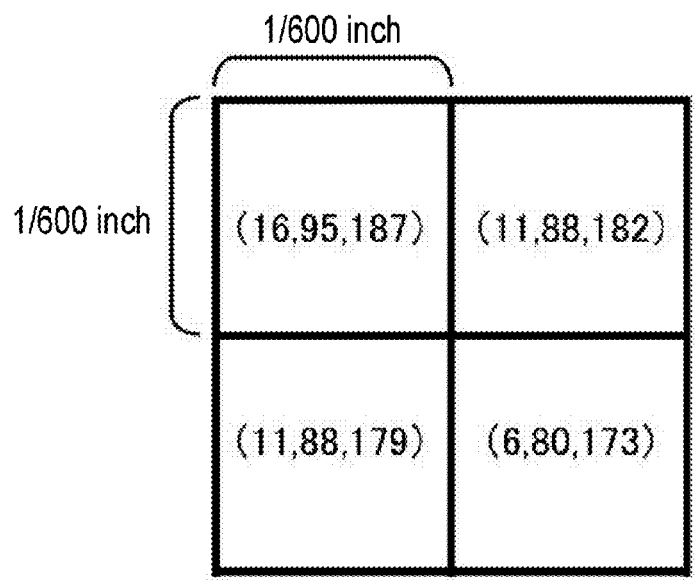
F I G. 3B
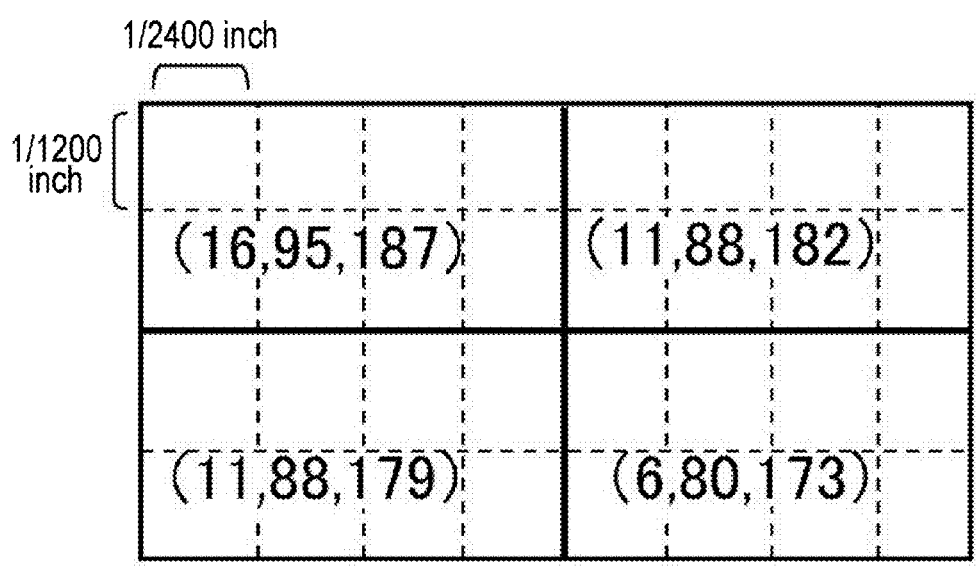

F I G. 4A
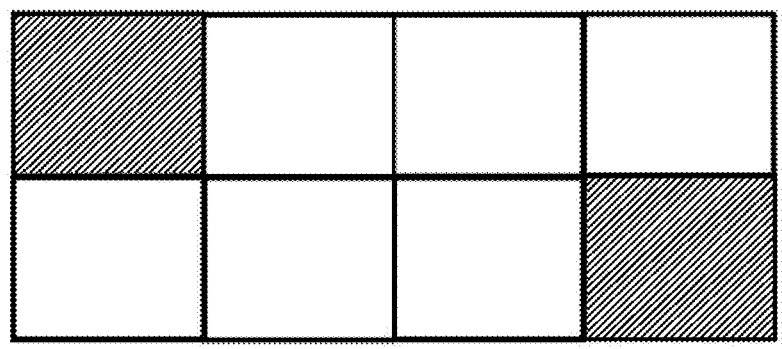
F I G. 4B
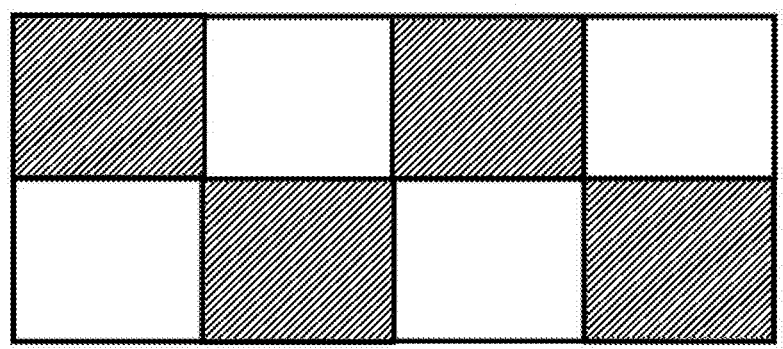

| INPUT SIGNAL VALUE (8 BITS) | | | INK AMOUNT (8 BITS) | | | | |
|---|---|---|---|---|---|---|---|
| R | G | B | C | M | Y | K | CL |
| 0 | 0 | 0 | 0 | 0 | 0 | 255 | 128 |
| 0 | 0 | 16 | 16 | 16 | 0 | 240 | 128 |
| 0 | 0 | 32 | 32 | 32 | 0 | 224 | 128 |
| ⋮ | ⋮ | ⋮ | ⋮ | ⋮ | ⋮ | ⋮ | ⋮ |
| 255 | 255 | 224 | 0 | 0 | 32 | 0 | 128 |
| 255 | 255 | 240 | 0 | 0 | 16 | 0 | 128 |
| 255 | 255 | 255 | 0 | 0 | 0 | 0 | 128 |

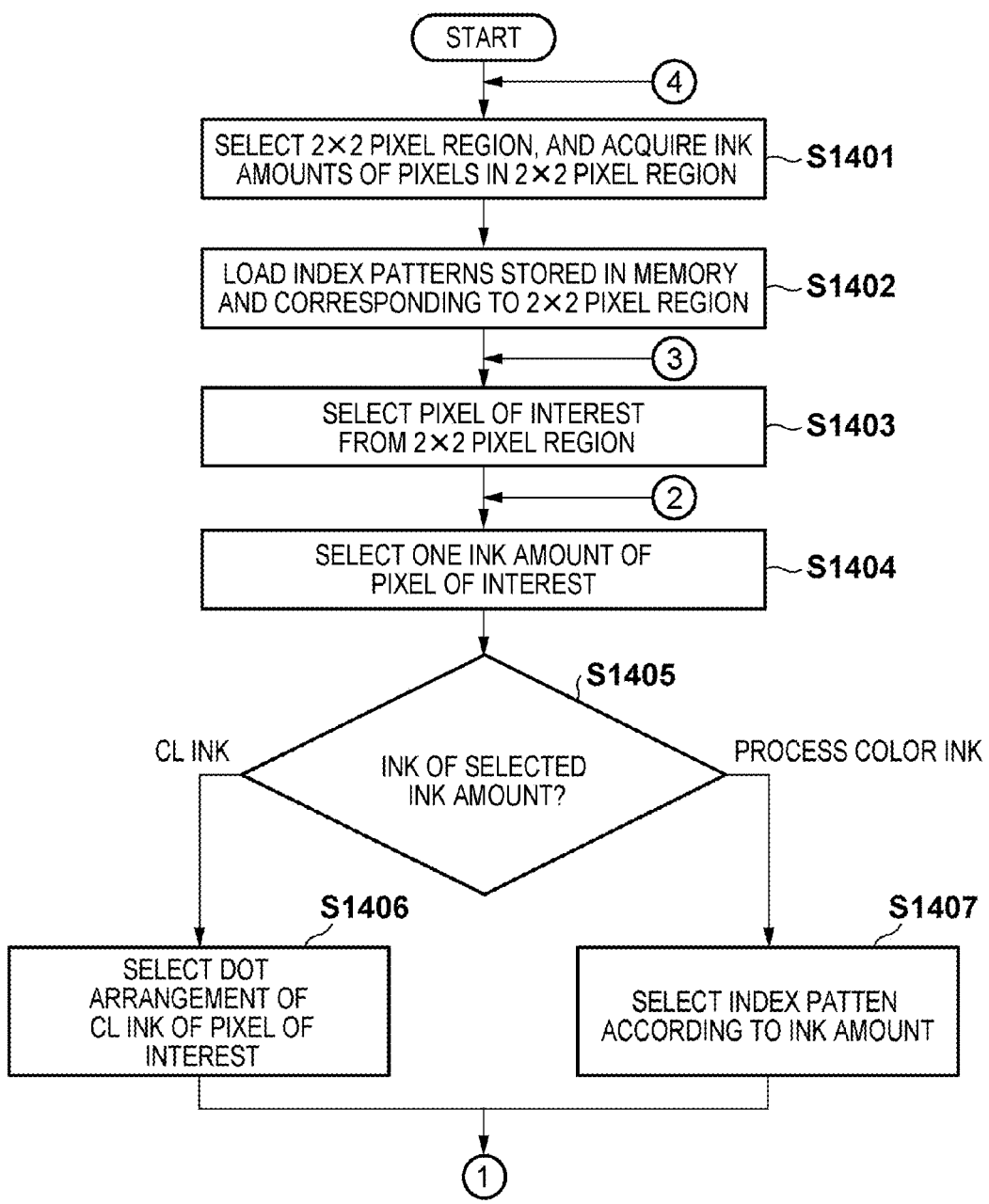
F I G. 14A

F I G. 14B
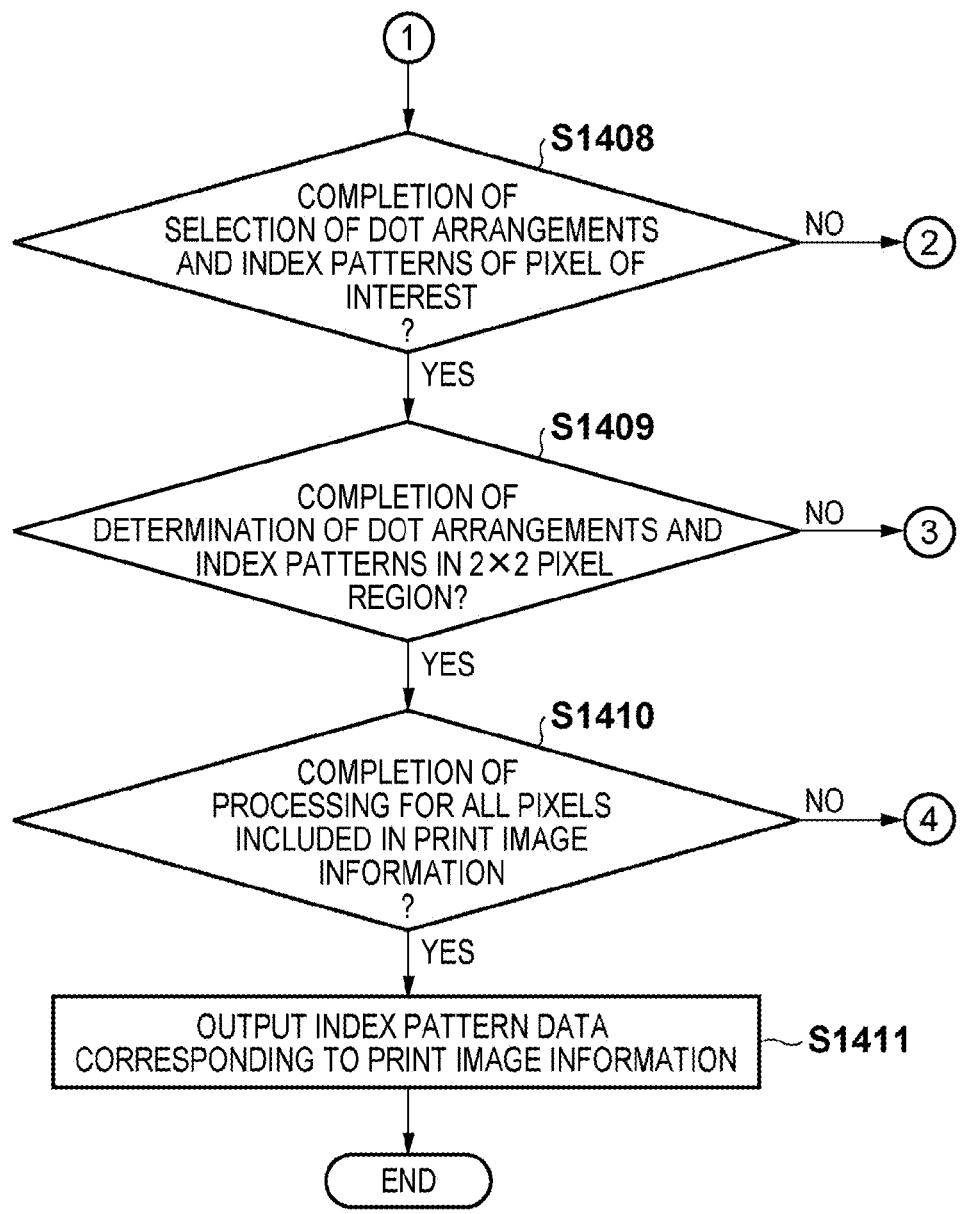

F I G. 15A
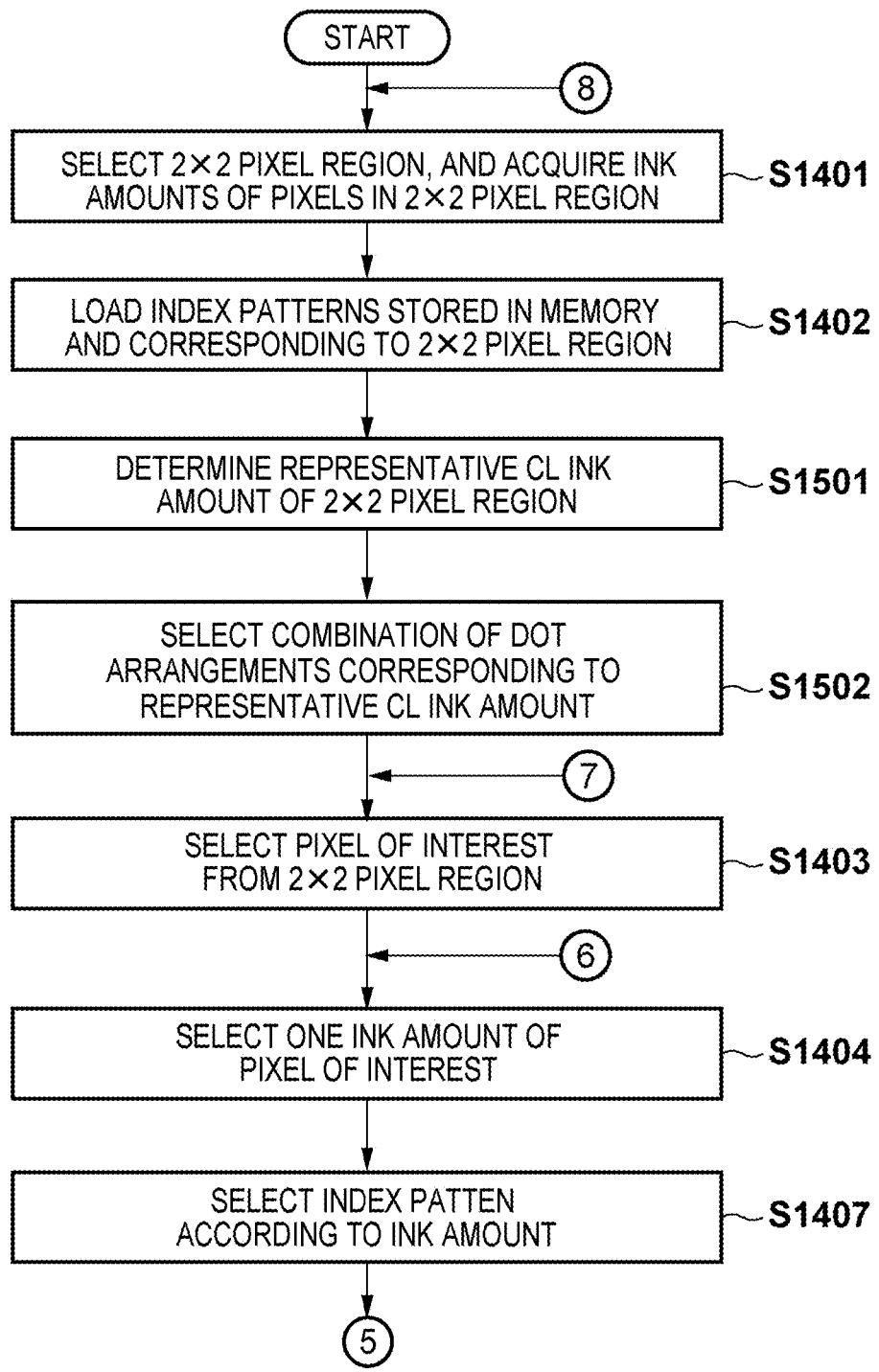

IMAGE PROCESSING APPARATUS AND IMAGE PROCESSING METHOD

TECHNICAL FIELD

The present invention relates to an image processing apparatus and image processing method and, more particularly, to an image processing apparatus and image processing method, which control coloring of specular reflection light on a printed matter.

BACKGROUND ART

There are various systems of printing apparatuses which print information such as characters and images on sheet-like printing media such as print sheets and films. As a representative system of forming characters and images by attaching color materials on a printing medium, an ink-jet system using a printhead which ejects inks is known.

Photo printing which prints an image on glossy paper using an ink-jet printing apparatus to form a photo-quality image has prevailed. The ink-jet printing apparatus popularly uses a dye ink using a dye, which is easily dissolved in water, as a color material. A color material dissolved in a solvent in the dye ink easily infiltrates a fibrous interior of a printing medium. Therefore, after an image is printed, the surface shape of the printing medium is easily maintained, and gloss of the printing medium is maintained as that of the printed image. That is, when an image is printed on a printing medium which is excellent in gloss using a dye ink, an image which is excellent in gloss can be obtained. In other words, the ink-jet printing apparatus using the dye ink can easily gloss over an image due to improvement of gloss of the printing medium.

On the other hand, there are requirements for light resistance and water resistance for a printed matter. Dye molecules of a color material in the dye ink are degraded by light, and the color of a printed image is readily faded (low light resistance). When a printed matter printed using the dye ink becomes wet with water, dye molecules infiltrated in the fibrous interior are dissolved in water, and an image unwantedly blurs (low water resistance). In order to solve problems about the light resistance and water resistance, the use of a pigment ink which uses a pigment as a color material has been increasing in recent years. Unlike the dye which exists in a solvent in a molecular state, the pigment exists in a solvent as particles as large as several ten nm to several μm. That is, color material particles of the pigment ink are large, and a printed matter with high light resistance can be obtained.

The pigment ink excels in light resistance and water resistance, but colorized specular reflection light of a printed image may often pose a problem in terms of image quality. An observer recognizes the specular reflection light as, for example, an image of an illumination reflected on the surface of the printed image. When the specular reflection light (and diffused light of an angle closer to the specular reflection light) is colorized, and an image of an illumination reflected on a printed matter is observed as a color different from the original illumination, such an image disturbs observation of an image, and is especially not preferable for a photo-printed image. As causes of coloring of the specular reflection light, a bronzing and thin-film interference are known.

The bronzing will be described below with reference to FIG. 1. Incident light 104 from a light source is reflected by a color material 102 printed on a printing medium 101. Specular reflection light 103 is light which is reflected in a direction of the same angle θ as an incident angle θ of the incident light 104. Since the reflectance of the color material 102 depends on the wavelength of light, a spectral distribution of the incident light 104 is different from that of the specular reflection light 103, thus recognizing the colorized specular reflection light 103. This is the bronzing, and the specular reflection light 103 is colorized with a color unique to the color material 102. Especially, it is known that the specular reflection light is colorized with magenta by a cyan color material.

The thin-film interference will be described below with reference to FIG. 2. Specular reflection light with respect to incident light 207 from a light source includes specular reflection light 204 reflected by the surface of a color material 203 printed on a printing medium 201 and specular reflection light 205 reflected by a boundary between the color material 203 and an underlying color material 202. Optical path lengths of the two specular reflection light rays 204 and 205 have a difference as large as a thickness of the color material 203, thus generating a phase difference between the two specular reflection light rays 204 and 205. As a result, the two specular reflection light rays 204 and 205 interfere with each other, thus coloring specular reflection light to be observed. This is the thin-film interference.

The bronzing and thin-film interference depend on a material near the surface of a printed matter, and their degrees of generation are also different depending on a structure near the surface. This structure is, for example, a ratio of an ink (covering ratio) which occupies the surface of a printing medium. That is, since the surface of a printed matter is configured by structures and materials which are different depending on colors or tones, colors of specular reflection light are different depending on the colors or tones. As a result, specular reflection light from an image configured by a plurality of colors is observed as different colors depending on image positions, thus providing a feeling of strangeness to an observer of the image.

As a method of solving this problem, a technique for overcoating a yellow ink on an image is available (Japanese Patent Laid-Open No. 2004-181688). Also, a technique for overcoating an ink (clear ink) containing a clear and colorless color material on the entire printed region of an image is available (Japanese Patent Laid-Open No. 2003-132350).

The method of Japanese Patent Laid-Open No. 2004-181688 mixes an ink which is not necessary for color reproduction (for example, the method adds a yellow ink upon reproduction of cyan). Mixing of the ink which is not necessary for color reproduction results in a decrease in saturation, and reduces a color reproduction range (color gamut).

Overcoating of a clear ink in the method of Japanese Patent Laid-Open No. 2003-132350 does not impose any influence on color reproduction, but it cannot always suppress the bronzing.

SUMMARY OF INVENTION

In one aspect, an image processing apparatus for printing an image using a plurality of color materials and a colorless material, comprising: a memory which stores information indicating a plurality of dot placements which include different dot placements of the colorless material and correspond to an amount of the colorless material; an inputting unit, configured to input color material amount data indicating amounts of the plurality of color materials and the amount of the colorless material for each pixel; and a first determiner, configured to determine a dot placement of the colorless material from the plurality of dot placements based on the amount of the colorless material indicated by the input color material amount data, so that coloring of specular reflection light on the pixel becomes closer to an achromatic color.

In another aspect, a method of printing an image using a plurality of color materials and a colorless material, comprising the steps of: storing information indicating a plurality of dot placements, which include different dot placements of the colorless material and correspond to an amount of the colorless material, in a memory; inputting color material amount data indicating amounts of the plurality of color materials and the amount of the colorless material for each pixel; and determining a dot placement of the colorless material from the plurality of dot placements based on the amount of the colorless material indicated by the input color material amount data, so that coloring of specular reflection light on the pixel becomes closer to an achromatic color.

According to the aspects of the present invention, coloring of specular reflection light on a printed matter can be suppressed.

Further features of the present invention will become apparent from the following description of exemplary embodiments with reference to the attached drawings.

BRIEF DESCRIPTION OF DRAWINGS

FIGS. 3A and 3B are views showing the relationship between a pixel and a cell which configures the pixel.

FIGS. 4A and 4B are views showing the relationship between an index pattern and ON/OFF of dots.

FIGS. 14A and 14B are flowcharts for explaining processing of a dot arrangement unit which determines dot placements of the CL ink and index patterns of the process colors.

FIGS. 15A and 15B are flowcharts for explaining processing of the dot arrangement unit executed when different dot placements of the CL ink are to be juxtaposed.

DESCRIPTION OF EMBODIMENTS

Figure 1:
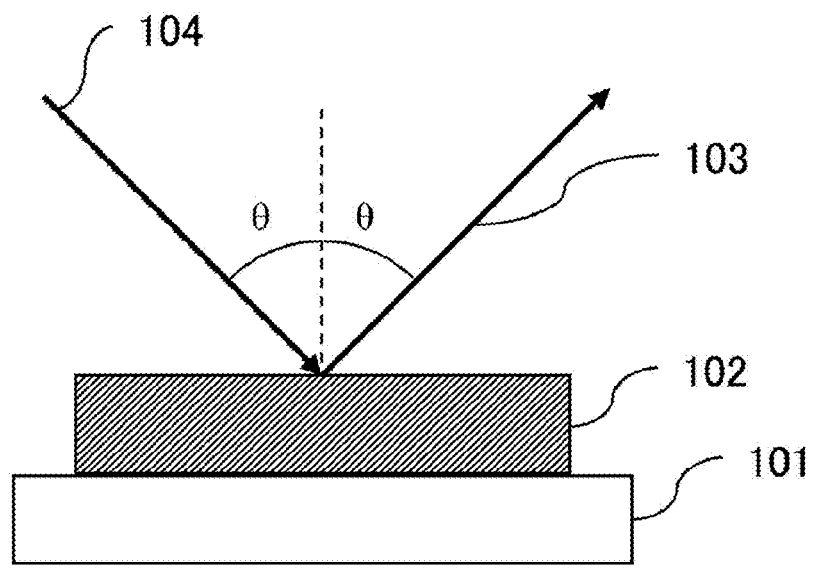
FIG. 1 is a view for explaining a bronzing.
Figure 2:
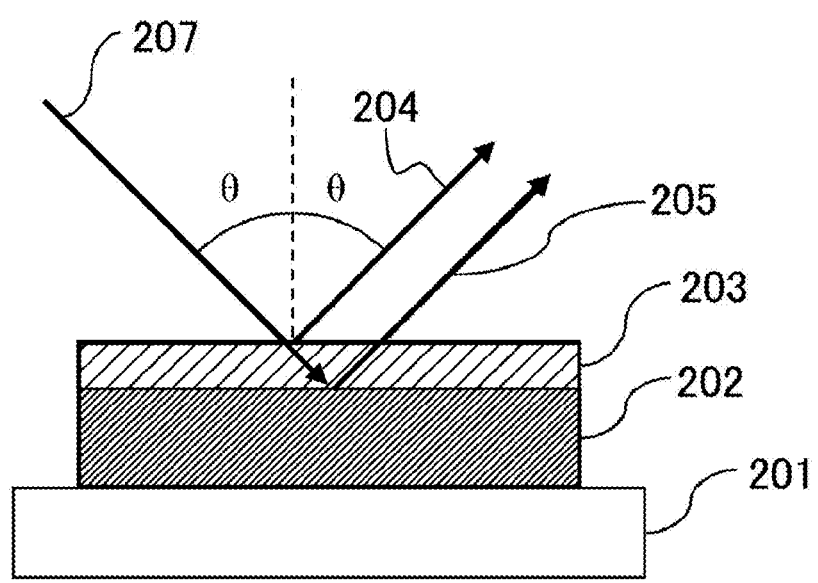
FIG. 2 is a view for explaining a thin-film interference.

An image processing apparatus and image processing method according to embodiments of the present invention will be described in detail hereinafter with reference to the drawings.

First Embodiment

A method of changing dot placements of an ink which does not contain any colorant (color material) and substantially contains a clear and colorless color material for respective regions to control local coloring of specular reflection light, and suppressing global coloring of specular reflection light will be described below. The reason why expressions "local coloring of specular reflection light" and "global coloring of specular reflection light" are used is that coloring of specular reflection light depends on an observation scale. That is, "global coloring of specular reflection light" is that which is averaged in a scale or more in which one can recognize coloring of specular reflection light. Also, "local coloring of specular reflection light" is that which is averaged in a scale (about several 10 μm) in which one cannot recognize coloring of specular reflection light. In the following description, a color material containing a colorant will often be referred to as a "color material", a clear and colorless color material will often be referred to as a "clear color material (or colorless material)", and an ink containing the clear color material will often be referred to as a "clear ink".

A "pixel" is an image of a minimum unit which allows tone expression and is used as a target in multi-valued data image processing (for example, color matching, color separation, gamma correction, halftoning, and the like). In halftoning, one pixel corresponds to an index pattern which is configured by, for example, 2×4 cells, and each cell defines formation/non-formation (to be referred to as ON/OFF hereinafter) of a "dot" as a minimum unit which can be printed by an image printing apparatus. "Image data" in the above color matching, color separation, and gamma correction represents a set of pixels, and each pixel is image data having an 8-bit tone value per color. Therefore, the aforementioned halftoning converts image data of a pixel having an 8-bit tone value per color into, for example, data (index pattern) having nine tones per color.

FIGS. 3A and 3B show the relationship between a pixel and a cell which configures the pixel.

FIG. 3A shows four (=2×2) pixels, and FIG. 3B shows correspondence between the four pixels shown in FIG. 3A and index patterns each including 2×4 cells. Note that FIGS. 3A and 3B show examples of the resolutions of the pixel and cell. However, the resolutions of the pixel and cell are not limited to them.

FIGS. 4A and 4B show the relationship between the index patterns and ON/OFF of dots. An index pattern is determined based on an amount of ink to be applied per pixel (to be referred to as an ink amount hereinafter). FIG. 4A shows a dot placement example corresponding to an ink amount=64, and FIG. 4B shows that corresponding to an ink amount=128. The ink amount is a measure which represents the number of ON dots to be arranged in one pixel. For example, an ink amount=0 represents a state in which no ON dot is arranged in one pixel, and an ink amount=255 represents a state in which all dots (eight dots in the example of FIGS. 4A and 4B) in one pixel are ON. Note that when a dot is ON, a dot is formed on a printing medium by ejecting an ink; when a dot is OFF, an ink is not ejected (no dot is formed on a printing medium).

[Coloring of Specular Reflection Light]

Figure 5:
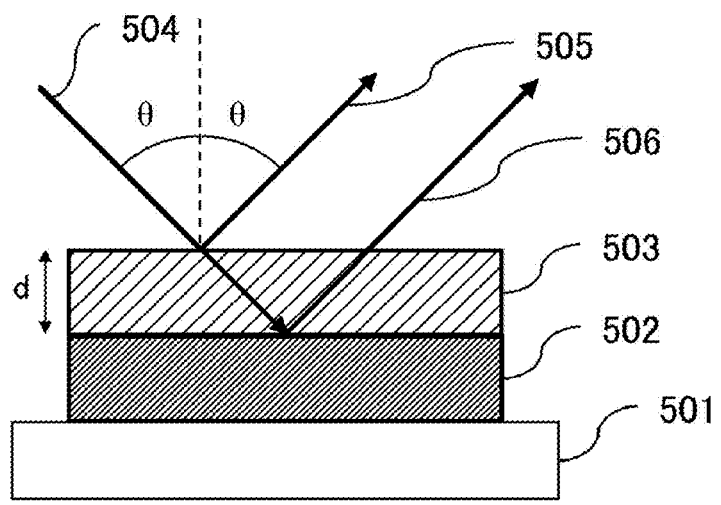
FIG. 5 is a view for explaining a cause of coloring of specular reflection light.

A cause of coloring of specular reflection light will be described below with reference to FIG. 5. FIG. 5 shows a sample prepared by overlaying a color material 502 and clear color material 503 on a printing medium 501. When light 504 is radiated from a direction having a tilt angle θ with respect to a normal to the sample surface, specular reflection light 505 is reflected by the surface of the clear color material 503, and specular reflection light 506 is reflected by a boundary between the clear color material 503 and color material 502. These specular reflection light rays 505 and 506 have an optical path difference L given by:

$$L = 2nd \cdot \cos\theta \quad (1)$$

where
  n is a refractive index of the clear color material 503,
  d is a thickness of the clear color material 503, and
  θ is an incident angle of the light 504.

A phase difference φ between the specular reflection light rays 505 and 506 is expressed by:

$$\phi = 2\pi/\lambda \times L = 2\pi \cdot 2nd \cdot \cos\theta/\lambda \quad (2)$$

where λ is a wavelength of the light 504.

When the phase of one specular reflection light is set to be 0, its amplitude is cos 0, that is, 1. Since the phase of the other specular reflection light is shifted by φ, its amplitude is cos φ=cos(4πnd·cos θ/λ). Therefore, an average value Am of the amplitudes of the two specular reflection light rays 505 and 506 is given by:

$$Am = (1/2) \cdot \{1 + \cos(4\pi nd \cdot \cos\theta/\lambda)\} \quad (3)$$

Also, since an intensity I of reflected light is proportional to a square of the amplitude, it is given by:

$$I = (1/4) \cdot \{1 + \cos(4\pi nd \cdot \cos\theta/\lambda)\}^2 \quad (4)$$

Assuming that the amplitude of the incident light 504 is 1, the intensity I of the reflected light can be defined as a reflectance. Therefore, tristimulus values XYZ of specular reflection light and a film thickness d satisfy relationships given by:

$$X = K \int S(\lambda) \cdot (1/4) \cdot \{1 + \cos(4\pi nd \cdot \cos\theta/\lambda)\}^2 x(\lambda) d\lambda$$

$$Y = K \int S(\lambda) \cdot (1/4) \cdot \{1 + \cos(4\pi nd \cdot \cos\theta/\lambda)\}^2 y(\lambda) d\lambda$$

$$Z = K \int S(\lambda) \cdot (1/4) \cdot \{1 + \cos(4\pi nd \cdot \cos\theta/\lambda)\}^2 z(\lambda) d\lambda \quad (5)$$

where
  S(λ) is a spectral distribution of the light 504,
  x(λ), y(λ), and z(λ) are color matching functions of a CIEXYZ color system,
  an integral range is a wavelength range (from 380 nm to 780 nm in general) of visible light, and
  K is a proportional constant.

As given by equations (5), the color of the specular reflection light changes depending on the thickness d of the clear color material 503. Note that descriptions about multiple reflection, reflection inside the color material 502, and wavelength selective reflection caused by wavelength dispersion of a refractive index are not given for the sake of simplicity. However, even in consideration of these reflections, the color of the specular reflection light changes depending on the thickness d of the clear color material 503.

[Overview of Coloring Control of Specular Reflection Light]

Figure 6:
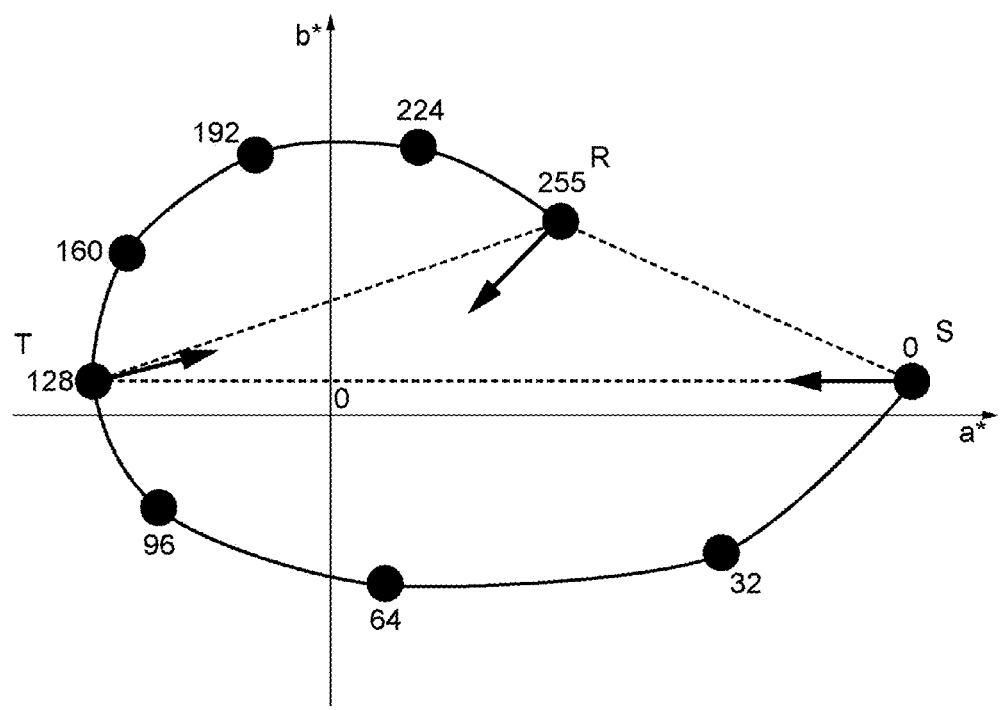
FIG. 6 is a graph for explaining a state in which a color of specular reflection light changes depending on the thickness of a clear color material.

A state in which the color of the specular reflection light changes depending on the thickness of the clear color material will be described below with reference to FIG. 6. FIG. 6 is a graph obtained when colors of specular reflection light rays of images each of which is formed by covering the surface of a printing medium 100% by a cyan color material, and by overcoating a clear color material, the ink amount of which is changed from 0 to 255, are measured, and chromaticities ab as measurement results are plotted on an ab plane. The reason why the chromaticities ab of the specular reflection light rays of images overcoated by the clear color material form a locus shown in FIG. 6 is that the thickness of the clear color material changes depending on an ink amount (to be referred to as a CL ink amount hereinafter) of a clear ink (to be referred to as a CL ink hereinafter).

Figure 7A:
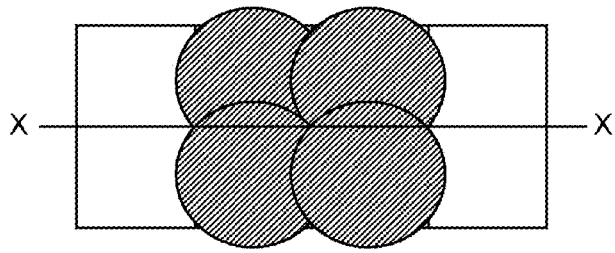
FIGS. 7A to 7D are views for explaining an example in which the thickness of a clear color material locally varies.
Figure 7B:
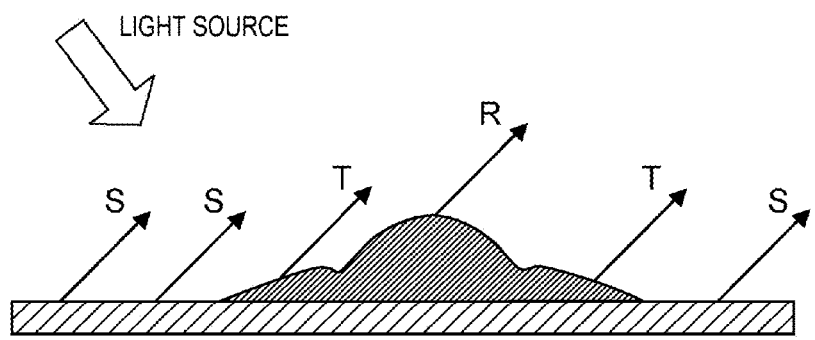

An example in which the thickness of the clear color material locally varies will be described below with reference to FIGS. 7A to 7D. FIG. 7A shows a dot placement of a CL ink when a CL ink amount is "128" on an index pattern region, and FIG. 7B shows an X-X section of FIG. 7A. As shown in FIG. 7B, overlaps of dots of the clear color material generate a colorized ray corresponding to a CL ink amount=0 (colorized ray S shown in FIG. 6), that corresponding to a CL ink amount=128 (colorized ray T shown in FIG. 6), and that corresponding to a CL ink amount=255 (colorized ray R shown in FIG. 6).

Figure 7C:
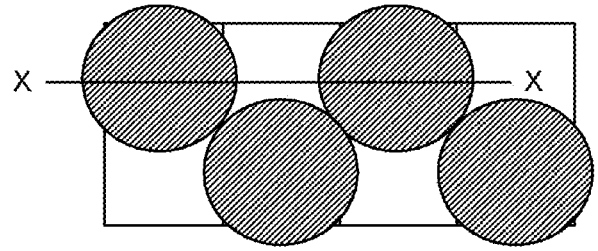
Figure 7D:
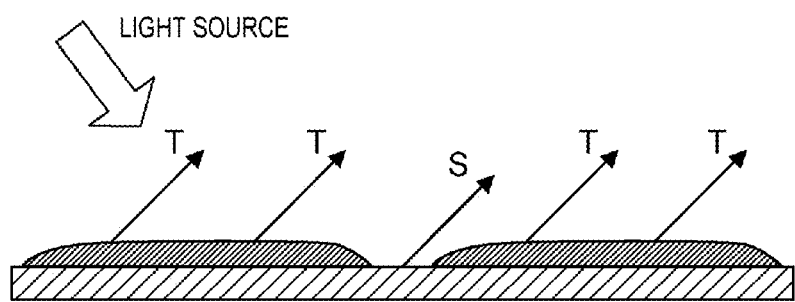

Also, FIG. 7C shows another dot placement of the CL ink when the CL ink amount is "128", and FIG. 7D shows an X-X section of FIG. 7C. In this case, as shown in FIG. 7D, the colorized ray corresponding to the CL ink amount=0 (colorized ray S shown in FIG. 6) and that corresponding to the CL ink amount=128 (colorized ray T shown in FIG. 6) are generated, but the colorized ray corresponding to the CL ink amount=255 (colorized ray R shown in FIG. 6) is not generated.

Hence, using the dot placement in which dots of the clear color material overlap each other, as shown in FIG. 7A, the locally colorized rays S, T, and R of the specular reflection light are mixed to eliminate the global coloring of the specular reflection light. That is, by arranging dots of the clear color material as close as possible on the index pattern region, the thickness of the clear color material in the region is changed to mix specular reflection light rays of a plurality of colors, thereby eliminating the global coloring of the specular reflection light.

The CL ink amount which can eliminate the aforementioned global coloring of the specular reflection light will be described below. When the number of dots of the clear color material is 1 on the index pattern region, since dots cannot be overlaid, the thickness of the clear color material does not sufficiently change. Conversely, when the number of dots of the clear color material is 5 or more on the index pattern region, the dots are overlaid too much to appropriately change the thickness of the clear color material. As can be seen from the above description, the number of dots of the clear color material, which is suited to eliminating the global coloring of the specular reflection light, ranges from 2 (inclusive) to 4 (inclusive). Furthermore, the most suitable CL ink amount which can generate the locally colorized specular reflection light rays S, T, and R corresponds to a case of four dots of the clear color material, which can realize the thickness obtained from a region on which four dots overlap each other to that obtained from a region without any clear color material.

[Overview of Apparatus]

Figure 8:
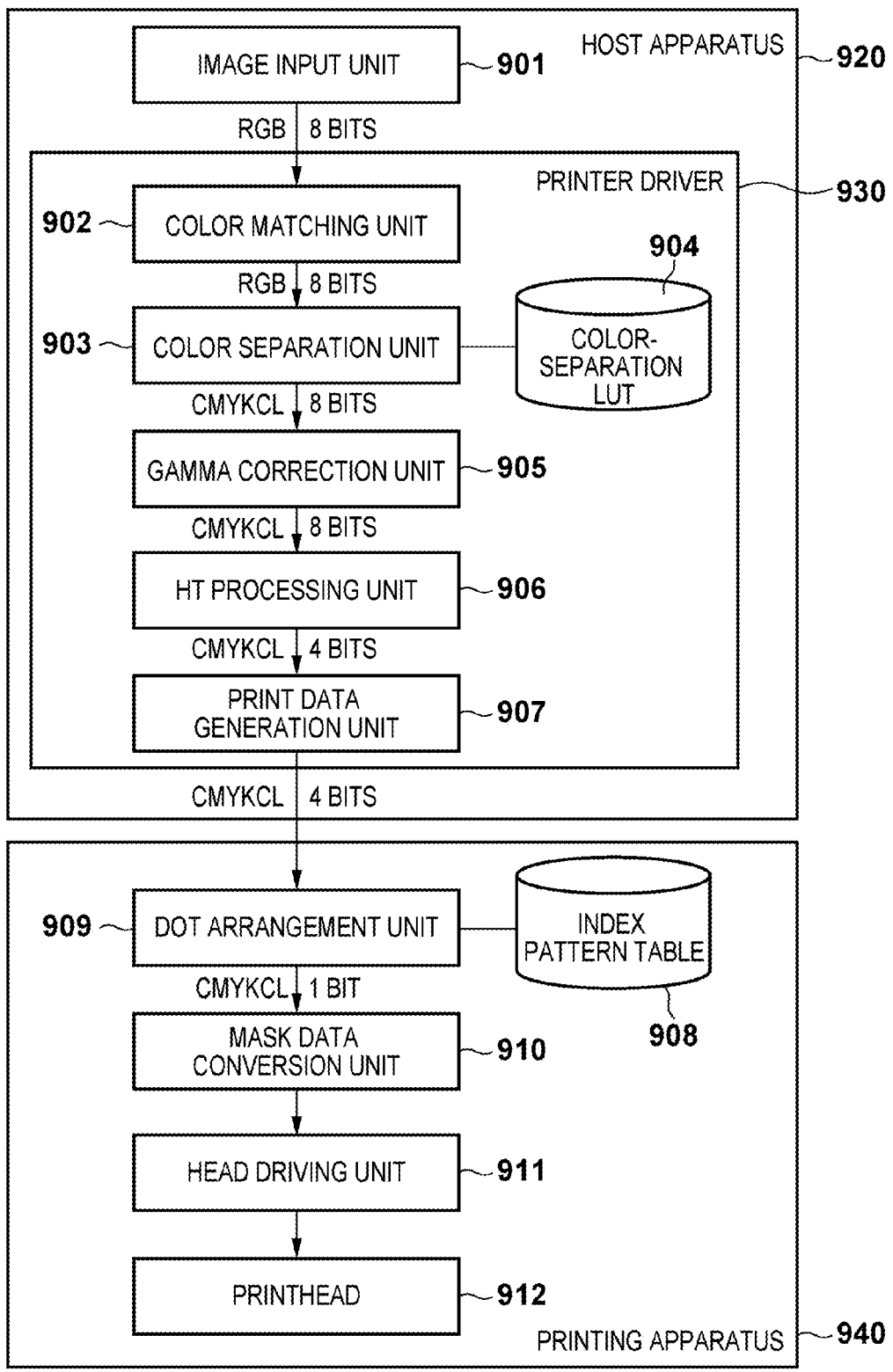
FIG. 8 is a block diagram for explaining the arrangement of an image processing apparatus according to an embodiment.

The arrangement of the image processing apparatus of this embodiment will be described below with reference to the block diagram shown in FIG. 8. A printing apparatus 940 prints an image using four types of process color inks containing color materials (pigments) of cyan C, magenta M, yellow Y, and black K, and a CL ink containing a clear color material. That is, a printhead 912 ejects these five types of inks.

Printer Driver

A printer driver 930 is a program which runs on an OS (Operating System) of a host apparatus 920 as, for example, a personal computer (PC). An image input unit 901 of the host apparatus 920 inputs image data to be printed from an apparatus outside the host apparatus 920 together with a print instruction, and image data to be printed, which is generated by an application that runs on the host apparatus 920.

A color matching unit 902 of the printer driver 930 maps a color gamut to be reproduced by input image data (for example, sRGB data) onto that of the printing apparatus 940. For example, the color matching unit 902 attains matching between colors displayed on a monitor having a color gamut corresponding to sRGB, and those to be reproduced by the printing apparatus 940.

A color separation unit 903 color-separates image data after color matching into image data (for example, color material amount data such as CMYK data and CL data) corresponding to the color materials used by the printing apparatus 940 with reference to a color-separation lookup table (LUT) 904. An example of the color-separation LUT 904 will be described below with reference to FIG. 9. The color-separation LUT 904 stores, for example, output signal values CMYKCL corresponding to input signal values RGB. Note that the output signal values C, M, Y, K, and CL respectively correspond to the ink amounts of the corresponding inks. The CL ink amount is fixed to a value which can most change the thickness of the clear color material independently of the input signal values RGB. For example, the CL ink amount is fixed to "128" as a value that allows to apply four dots of the clear color material on an index pattern region. Note that the CL ink amount is not limited to "128" as long as it can change the thickness of the clear color material.

A gamma correction unit 905 executes tone conversion (gamma correction) for respective ink amounts of the colors output from the color separation unit 903, thereby correcting the tone characteristics of the printing apparatus 940 to linear characteristics. A halftone (HT) processing unit 906 quantizes, for example, the ink amount of 8 bits per color output from the gamma correction unit 905 into 4 bits per color using, for example, an error diffusion method. Note that the error diffusion method determines a tone value (output value O) after quantization by comparing a sum of a value of a pixel of interest and a diffused error (input value I) with a threshold, which is set in advance, as expressed by:

if $(I<16)$ $O=0$;

if $(16 \leq I<48)$ $O=1$;

if $(48 \leq I<80)$ $O=2$;

if $(80 \leq I<112)$ $O=3$;

if $(112 \leq I<144)$ $O=4$;

if $(144 \leq I<176)$ $O=5$;

if $(176 \leq I<208)$ $O=6$;

if $(208 \leq I<240)$ $O=7$;

else $O=8$; (6)

Then, a difference between the input and output values is diffused to a subsequent pixel as an error. That is, the diffused error is an accumulated value of errors diffused from pixels which have already undergone HT processing.

In this way, the ink amount after the HT processing is expressed by 9 steps (0 to 8). The following description will be given under the assumption that the ink amounts of the respective steps are "0", "32", "64", "96", "128", "160", "192", "224", and "255", for the sake of simplicity.

A print data generation unit 907 converts the ink amounts after the HT processing output from the HT processing unit 906 into print data of a predetermined format, and outputs the print data to the printing apparatus 940. A format example of print data will be described below with reference to FIG. 10.

Figures 9, 10:
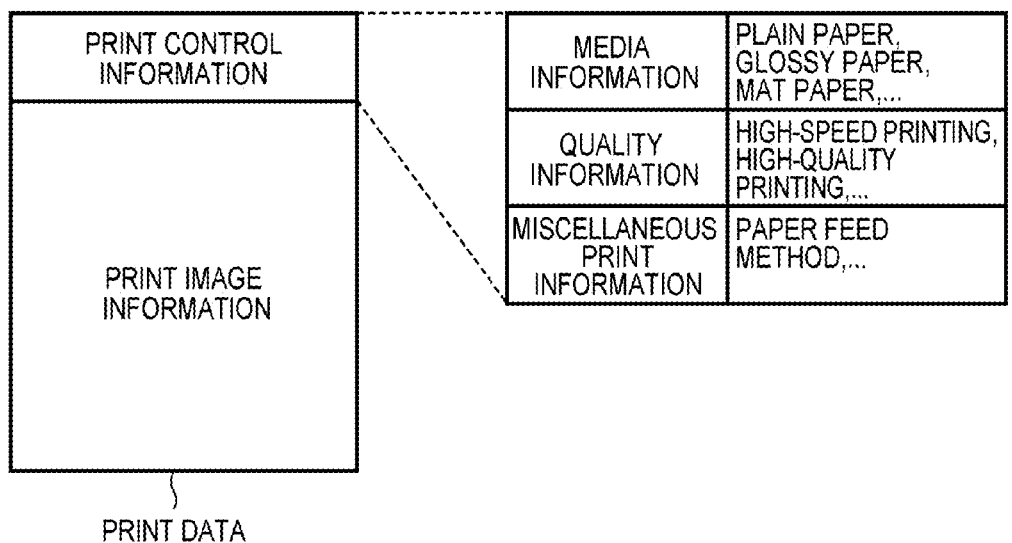
FIG. 9 is a table for explaining an example of a color-separation LUT.
FIG. 10 is a view for explaining a format example of print data.

As shown in FIG. 10, print data is configured by print control information and print image information (print image data). The print control information has "media information" indicating a medium to be used in printing, "quality information" indicating print quality, and "miscellaneous print information" indicating a paper feed method and the like. The media information indicates, for example, one of plain paper, glossy paper, coated paper, mat paper, and the like as the type of a printing sheet to be used in printing. The quality information specifies high-speed printing, high-quality printing, or the like. Note that the print control information is configured based on the contents, which are designated by the user using a user interface provided by the printer driver 930. The print image information describes image data output from the HT processing unit 906.

In the aforementioned example, the printer driver 930 executes the HT processing, and generates print data including image data after the HT processing. However, the printer driver 930 may output print data including image data before the HT processing, and the printing apparatus 940 may execute the HT processing.

Printing Apparatus

A dot arrangement unit 909 of the printing apparatus 940 acquires ink amounts of respective pixels from the print image information included in the print data received from the printer driver 930. Then, the dot arrangement unit 909 determines dot placements for respective pixels based on the acquired ink amounts. As for the process color inks, the dot arrangement unit 909 selects index patterns corresponding to the ink amounts from an index pattern table 908. More specifically, FIGS. 12A to 12I correspond to the ink amounts "0", "32", "64", "96", "128", "160", "192", "224", and "255" of each process color ink. As for the CL ink, the dot arrangement unit 909 selects an index pattern having a dot placement which corresponds to the ink amount CL and in which dots overlap each other.

Figure 11A:
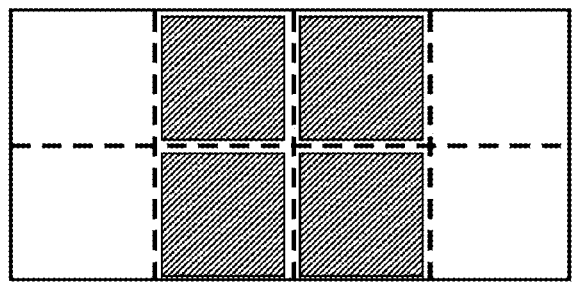
FIGS. 11A to 11D are views for explaining examples of index patterns for a CL ink.

Examples of index patterns for the CL ink will be described below. FIG. 11A shows an index pattern corresponding to an ink amount CL=128. In the index pattern shown in FIG. 11A, the dot placement and ink amount of the CL ink are fixed, and the colorized rays S, T, and R (see FIG. 6) are generated.

In this case, a plurality of different dot placements are prepared, as described above, and colorized specular reflection light rays of the respective dot placements are measured in advance. Then, a dot placement, which has a high suppression effect of coloring of specular reflection light, in other words, with which a color of specular reflection light becomes closer to an achromatic color, can be determined.

Upon completion of selection of the dot placements corresponding to the ink amounts of the respective pixels by the dot arrangement unit 909, index pattern data indicating the selected dot placements and index patterns are input to a mask data conversion unit 910.

In the aforementioned example, the dot placement and ink amount of the CL ink are fixed, but they need not always be fixed. Examples of different dot placements of the same CL ink amount will be explained first. As described above, FIG.

Figure 13A:
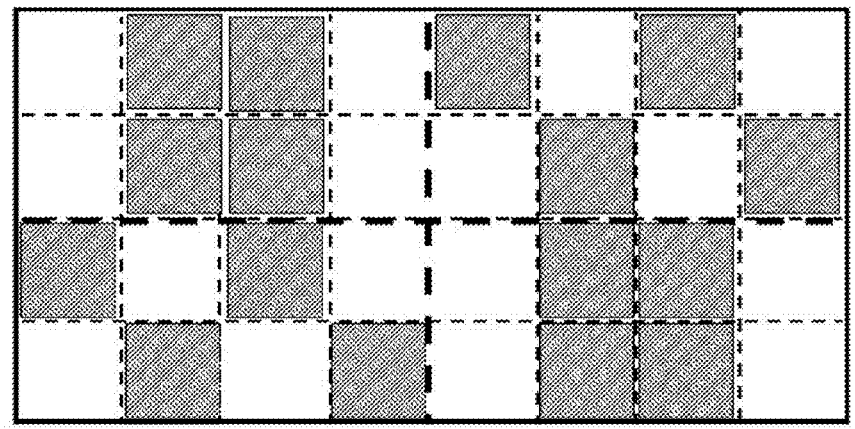
FIGS. 13A to 13C are views for explaining combination examples of dot placements of the CL ink.

7C shows an example in which a dot placement having the same CL ink amount=128 as in FIG. 7A is changed. As shown in the X-X sectional view of FIG. 7D, even with the dot placement shown in FIG. 7C, the colorized ray corresponding to the CL ink amount=0 (colorized ray S shown in FIG. 6) and that corresponding to the CL ink amount=128 (colorized ray T shown in FIG. 6) are mixed. That is, even when the CL ink amount remains the same, the dot placements shown in FIGS. 7A and 7C have different ratios of mixed specular reflection light colors. FIG. 13A shows an example in which different dot placements are combined and juxtaposed using this difference. As shown in FIG. 13A, for example, upper left and lower right dot placements adopt that shown in FIG. 7A, and upper right and lower left dot placements adopt that shown in FIG. 7C.

As described above, even when the CL ink amount remains the same, a plurality of patterns of different dot placements are prepared and combined to broaden the change width of the thickness of the clear color material, and more different colorized specular reflection light rays are mixed to eliminate the global coloring of the specular reflection light. That is, FIG. 13A shows a dot placement example in which different dot placements are juxtaposed, and a combination example of index patterns of the CL ink will be described below with reference to FIG. 13A. FIG. 13A shows a combination of index patterns in a 2×2 pixel region. FIG. 13A shows dot placements obtained by combining index patterns shown in FIGS. 11A and 11B, each of which corresponds to CL=128. Note that the index pattern shown in FIG. 11B corresponds to the dot placement shown in FIG. 7C, and generates the colorized rays S and T.

Dot Arrangement Unit

The processing of the dot arrangement unit 909 which determines the dot placements of the CL ink and the index patterns of the process color inks will be described below with reference to the flowcharts shown in FIGS. 14A and 14B.

The dot arrangement unit 909 selects a 2×2 pixel region from the print image information included in the print data received from the printer driver 930, and acquires ink amounts of respective pixels in the 2×2 pixel region (S1401). Then, the dot arrangement unit 909 loads a plurality of index patterns, which are stored in a memory such as a ROM (Read-Only Memory) and correspond to the 2×2 pixel region (S1402).

The dot arrangement unit 909 selects one pixel (pixel of interest) from the 2×2 pixel region (S1403), selects one of ink amounts of the pixel of interest (S1404), and checks whether or not the selected ink amount of that of the CL ink (S1405).

If the ink amount of the CL ink is selected, the dot arrangement unit 909 selects a dot placement of the CL ink of the pixel of interest from a plurality of dot placements corresponding to the CL ink amount of the index patterns loaded in step S1402 (S1406). Note that a dot placement, which has a high suppression effect of coloring of specular reflection light, in other words, with which the color of specular reflection light becomes closer to an achromatic color, is selected, as described above. On the other hand, if the ink amount of the process color ink is selected, the dot arrangement unit 909 selects an index pattern (one of FIGS. 12A to 12I) according to that ink amount (S1407).

The dot arrangement unit 909 then checks whether or not selection of dot placements and index patterns corresponding to the respective ink amounts of the pixel of interest is complete (S1408). If selection is not complete yet, the process returns to step S1404. If selection of dot placements and index patterns corresponding to the respective ink amounts of the pixel of interest is complete, the dot arrangement unit 909 checks whether or not the processes in steps S1404 to S1408 are complete for all the pixels in the 2×2 pixel region (S1409).

If pixels to be processed in steps S1404 to S1408 still remain, the process returns to step S1403, and the dot arrangement unit 909 selects the next pixel of the 2×2 pixel region, and dot placements and index patterns corresponding to respective ink amounts. After all the pixels of the 2×2 pixel region are selected, and the dot placements and index patterns corresponding to the respective inks are determined, the dot arrangement unit 909 checks whether or not processing for all pixels included in the print image information of the print data is complete (S1410).

If pixels to be processed still remain, the process returns to step S1401, and the dot arrangement unit 909 repeats steps S1401 to S1410 until the processing for all the pixels is complete. After the dot placements and index patterns corresponding to the ink amounts of the respective pixels are determined, the dot arrangement unit 909 outputs index pattern data corresponding to the print image information to the mask data conversion unit 910 (to be described later) (S1411).

Modification of Dot Placement

In the aforementioned example, the CL ink amount is fixed to "128". An example in which the CL ink amount is changed according to a total amount of the process color inks calculated using the color-separation LUT 904 will be further described below. Since the processes up to that of the color matching unit 902 are the same as those executed when the CL ink amount is fixed, a description thereof will not be repeated. Also, since the processes of the gamma correction unit 905, HT processing unit 906, and print data generation unit 907 are the same as those executed when the CL ink amount is fixed, a description thereof will not be repeated.

The processes of the color separation unit 903 and dot arrangement unit 909 executed when the CL ink amount is changed according to the total amount of the process color inks will be described below.

(Color Separation Unit)

The color separation unit 903 color-separates image data after color matching into image data (for example, color material amount data such as CMYK data and CL data) corresponding to the color materials used by the printing apparatus 940 with reference to the color-separation LUT 904 shown in FIG. 9.

Next, the color separation unit 903 calculates a total amount Ink of the process color inks using:

$$\text{Ink}=(C+M+Y+K); \quad (7)$$

Then, the color separation unit 903 determines a CL ink amount based on the total amount Ink calculated using equation (7) by:

if (Ink<256) $CL$=128;

if (256≤Ink<512) $CL$=96;

else $CL$=64; (8)

Note that in the aforementioned example, the CL ink amount is determined according to the total amount of the process color inks. Alternatively, the CL ink amount may be determined in consideration of not only the total amount of the process color inks but also an amount of acceptable inks. In this case, the amount of acceptable inks is an ink amount which can be printed per unit area of a printing medium per unit time. For example, an amount Max of acceptable inks, which is determined based on water absorption characteristics of a printing medium, moisture contents of color materials, and a print mode, may be stored in advance in the apparatus, and the CL ink amount may be calculated using:

Ink=(C+M+Y+K);

if (128<Max−Ink) CL=128;

if (96<Max−Ink) CL=96;

if (64<Max−Ink) CL=64;

if (32<Max−Ink) CL=32;

else CL=0;         (9)

(Dot Arrangement Unit)

The dot arrangement unit 909 selects a 2×2 pixel region from the print image information included in the print data received from the printer driver 930, and acquires ink amounts of respective pixels in the 2×2 pixel regions.

For an ink amount of each process color ink of the acquired ink amounts, the dot arrangement unit 909 selects an index pattern (one of FIGS. 12A to 12I) corresponding to the ink amount value. Note that FIGS. 12A to 12I respectively correspond to ink amounts "0", "32", "64", "96", "128", "160", "192", "224", and "255".

Figure 11B:
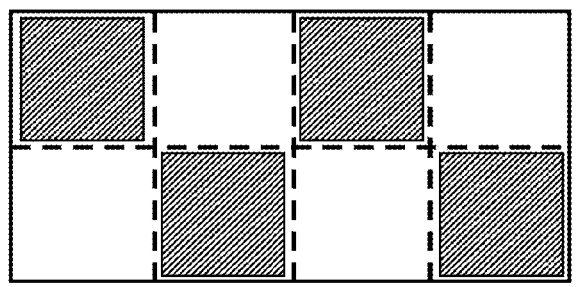
Figure 11C:
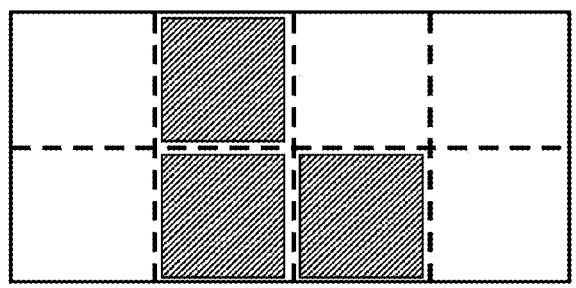
Figure 11D:
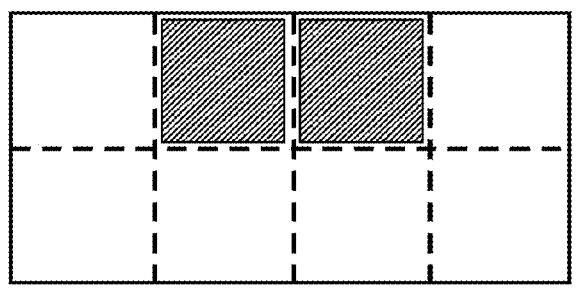
Figure 12A:
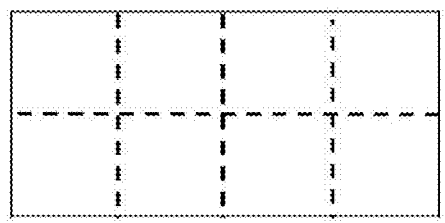
FIGS. 12A to 12I are views for explaining correspondence examples of ink amounts and index patterns of each process color.
Figure 12B:
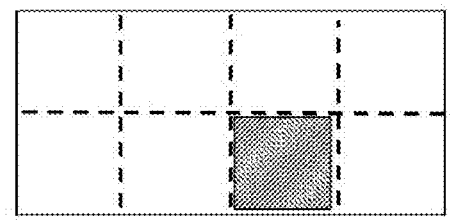
Figure 12C:
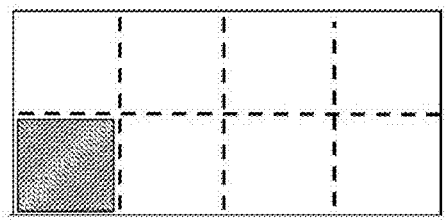
Figure 12D:
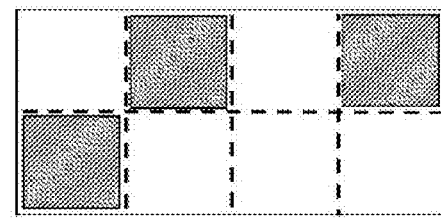
Figure 12E:
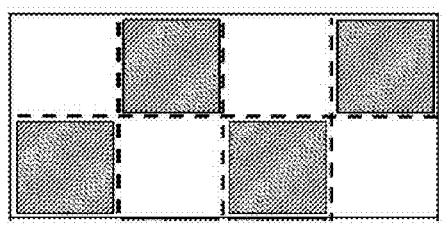
Figure 12F:
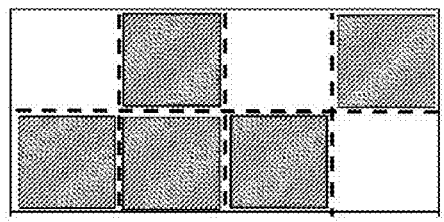
Figure 12G:
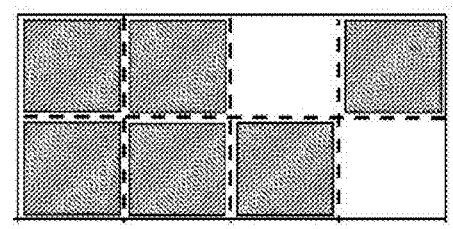
Figure 12H:
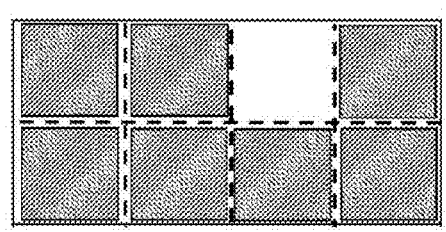
Figure 12I:
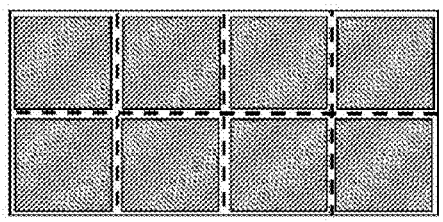

On the other hand, for the CL ink, the dot arrangement unit 909 selects a dot placements shown in any of FIGS. 11A to 11D according to the CL ink amount calculated using formulas (7) and (8) or (9). FIGS. 11A and 11B show dot placements corresponding to a CL ink amount=128, FIG. 11C shows a dot placement corresponding to a CL ink amount=96, and FIG. 11D shows a dot placement corresponding to a CL ink amount=64. Since both the dot placements shown in FIGS. 11C and 11D arrange dots to be closer to each other, they generate different locally colorized specular reflection light rays, thus eliminating the global coloring of specular reflection light.

After the dot placements and index patterns corresponding to the ink amounts of the respective pixels are determined, the dot arrangement unit 909 outputs index pattern data corresponding to the print image information to the mask data conversion unit 910.

Figure 13B:
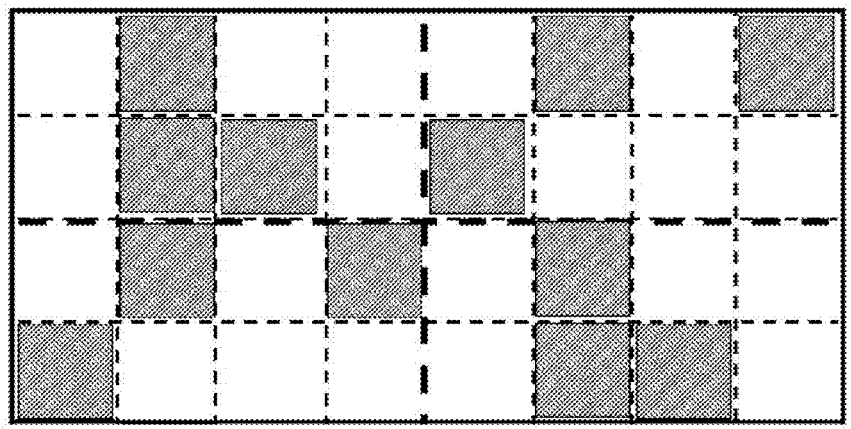
Figure 13C:
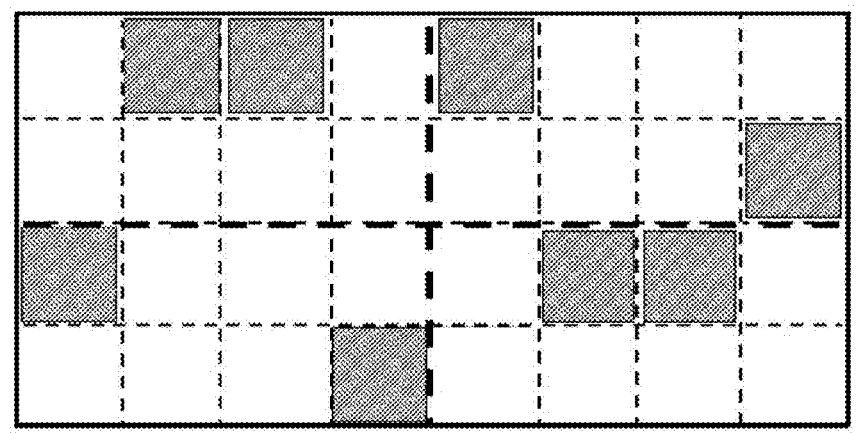

As an example of eliminating the global coloring of specular reflection light by further mixing different locally colorized specular reflection light rays, an example in which a plurality of dot placements are combined to have the CL ink amount according to the process color ink amounts will be described below. FIGS. 13B and 13C show combinations of dot placements of the CL ink when the CL ink amount=96 and 64. FIG. 13B shows a combination of dot placements corresponding to CL=96, and FIG. 13C shows a combination of dot placements corresponding to CL=64.

Figure 15B:
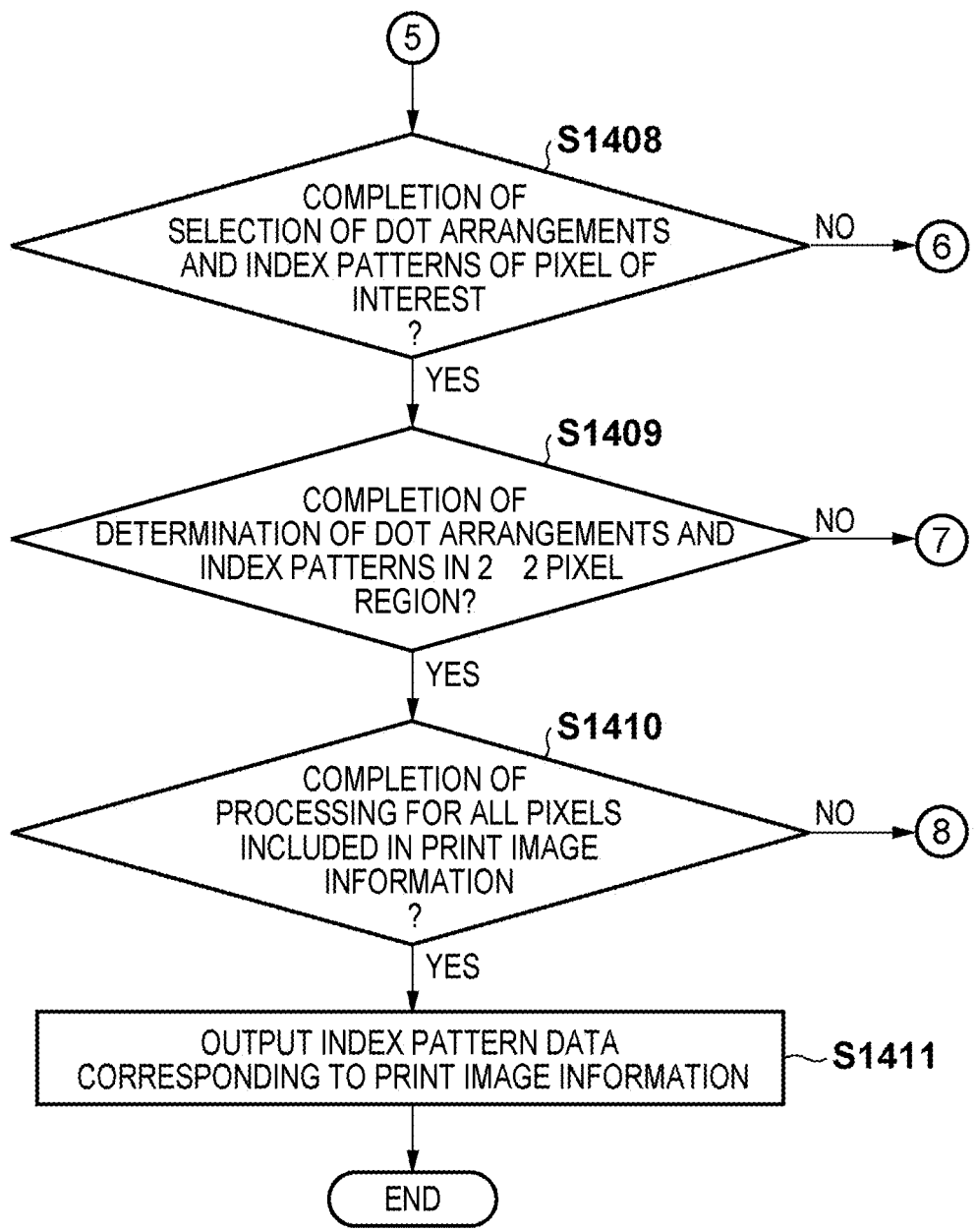

The processing of the dot arrangement unit 909 executed when different dot placements of the CL ink are juxtaposed will be described below with reference to the flowcharts shown in FIGS. 15A and 15B. Note that the same step numbers denote the same processes as those shown in FIGS. 14A and 14B, and a detailed description of these processes will not be repeated.

The dot arrangement unit 909 selects a 2×2 pixel region from the print image information included in the print data received from the printer driver 930, and acquires ink amounts of respective pixels in the 2×2 pixel region (S1401). Then, the dot arrangement unit 909 loads a plurality of index patterns, which are stored in a memory such as a ROM and correspond to the 2×2 pixel region (S1402).

Next, the dot arrangement unit 909 determines a representative CL ink amount from the CL ink amounts of the respective pixels loaded in step S1401 (S1501). Assume that the representative CL ink amount is a maximum CL ink amount in the 2×2 pixel region while attaching importance on the coloring elimination effect of specular reflection light. Note that the representative CL ink amount determination method is not limited to the above example. For example, when the color separation unit 903 determines the CL ink amount in consideration of the aforementioned amount Max of acceptable inks, a minimum CL ink amount in the 2×2 pixel region may be selected as the representative CL ink amount in consideration of ink pouring on the surface of a printing medium.

Then, the dot arrangement unit 909 selects, based on the representative CL ink amount determined in step S1501, a combination of dot placements corresponding to the representative CL ink amount from a plurality of combinations of dot placements which are stored in a memory such as a ROM and correspond to the 2×2 pixel region (S1502).

For example, when the memory records three combinations of dot placements shown in FIGS. 13A, 13B, and 13C, and when the representative CL ink amount determined in step S1501 is "128", the combination of dot placements shown in FIG. 13A is selected. When the representative CL ink amount is "96", the combination of dot placements shown in FIG. 13B is selected; when the representative CL ink amount is "64", that shown in FIG. 13C is selected.

The processes in step S1403 and subsequent steps are the same as those in steps S1403 to S1411 shown in FIGS. 14A and 14B, and a description thereof will not be repeated. However, since a combination of dot placements of the CL ink in the 2×2 pixel region is determined in steps S1501 and S1502, steps S1405 and S1406 shown in FIG. 14A are not included.

Note that a combination of dot placements is not limited to that for the 2×2 pixel region, but it may correspond to a region for a plurality of pixels such as a 4×4 pixel region or 4×2 pixel region.

Mask Data Conversion Unit

When the index patterns (ON/OFF of dots) determined by the dot arrangement unit 909 are input to a head driving circuit 911, an image represented by the image data input by the image input unit 901 can be printed. However, when the ink-jet printing apparatus adopts a multi-pass print mode, dots to be formed in respective scans of the printhead 912 are required to be determined in correspondence with the multi-pass print mode. In this embodiment, an image has to be printed using the process color inks, and the CL ink has to be overlaid. That is, the mask data conversion unit 910 controls dot printing operations in correspondence with the multi-pass print mode and superposition of the CL ink.

Figure 16:
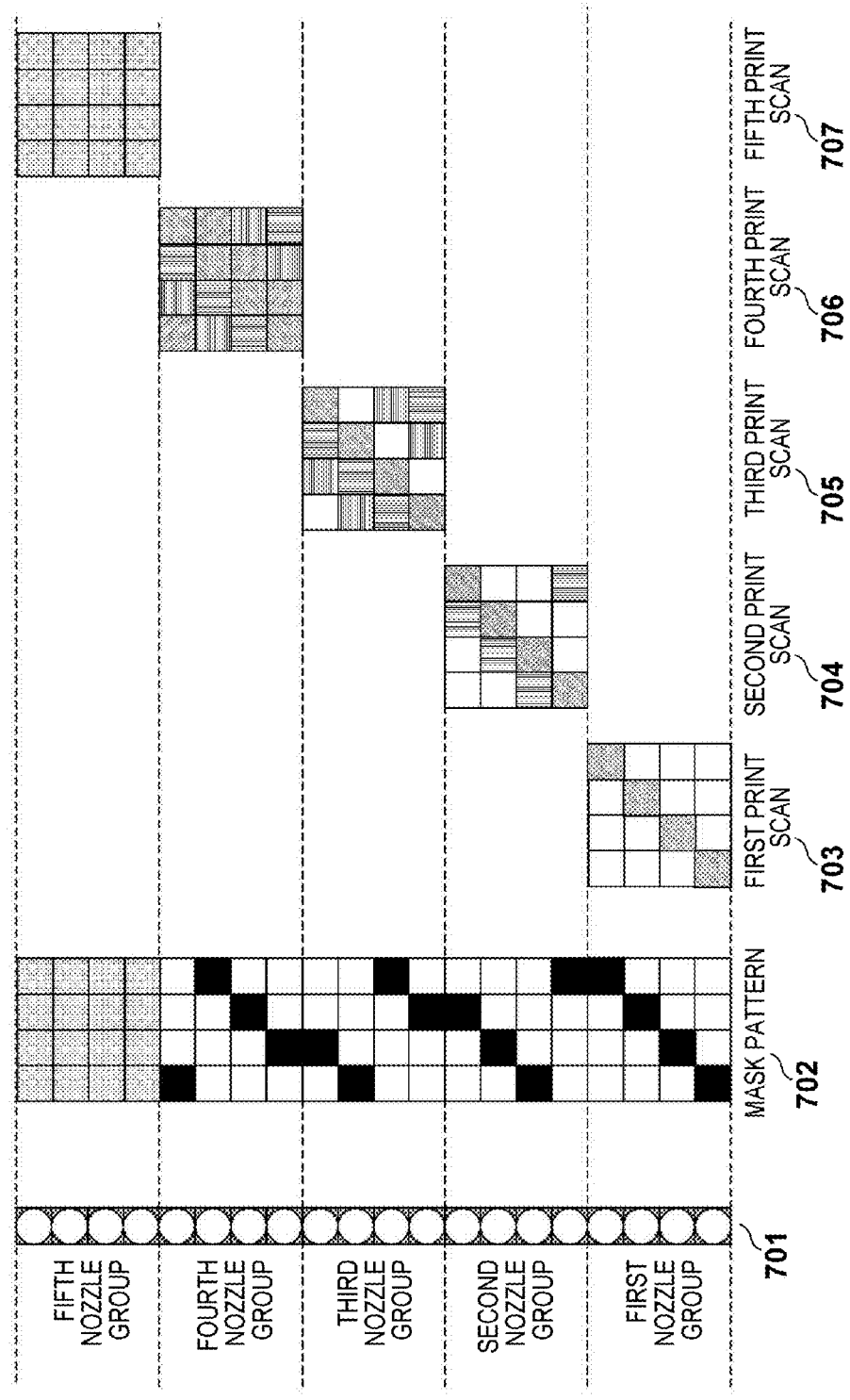
FIG. 16 is a view illustrating a printhead and printed patterns.

FIG. 16 illustrates the printhead and printed patterns. Assume that a printhead 701 has 20 nozzles for the sake of simplicity. The nozzles are divided into first to fifth nozzle groups, and each nozzle group includes four nozzles, as shown in FIG. 16.

A black cell of each mask pattern 702 corresponds to a dot to be printed by each nozzle, and patterns printed by the first to fourth nozzle groups mutually have a complementary relationship. For example, when a solid image is formed on a region corresponding to 4×4 cells, an image of the region corresponding to the 4×4 cells is formed by printing four dots by each of the first to fourth nozzle groups in first to fourth print scans 703 to 706. In other words, when patterns printed by the respective nozzle groups are overlaid, printing of the region corresponding to 4×4 cells is complete.

Every time each print scan is complete, a print sheet is conveyed by a height of each nozzle group. Therefore, an image of one region (corresponding to the height of each nozzle group) of a print sheet is completed by the four print scans 703 to 706. Since an image of one region of a print sheet is formed by the plurality of nozzle groups in the plurality of print scans, an effect of eliminating variations unique to nozzles and those of convey precision of a printing medium can be provided.

The fifth nozzle group ejects the CL ink. When the fifth nozzle group ejects the CL ink in a fifth print scan 707, the CL color material is arranged on the uppermost layer of the color materials.

In this manner, by controlling combinations of index patterns of the CL ink, coloring of specular reflection light on a printed matter can be controlled, thus suppressing coloring of specular reflection light on the printed matter.

Second Embodiment

An image processing apparatus and image processing method according to the second embodiment of the present invention will be described below. Note that the same reference numerals in the second embodiment denote the same components as those in the first embodiment, and a detailed description thereof will not be repeated.

In the first embodiment, the processing for determining a combination of dot placements of a CL ink based on, for example, an average amount of color materials on a 2×2 pixel region in a dot arrangement unit 909 has been described. The second embodiment will explain an example in which a resolution for the CL ink is reduced in advance, and dot placements are determined based on a CL ink amount corresponding to the reduced resolution.

Figure 17:
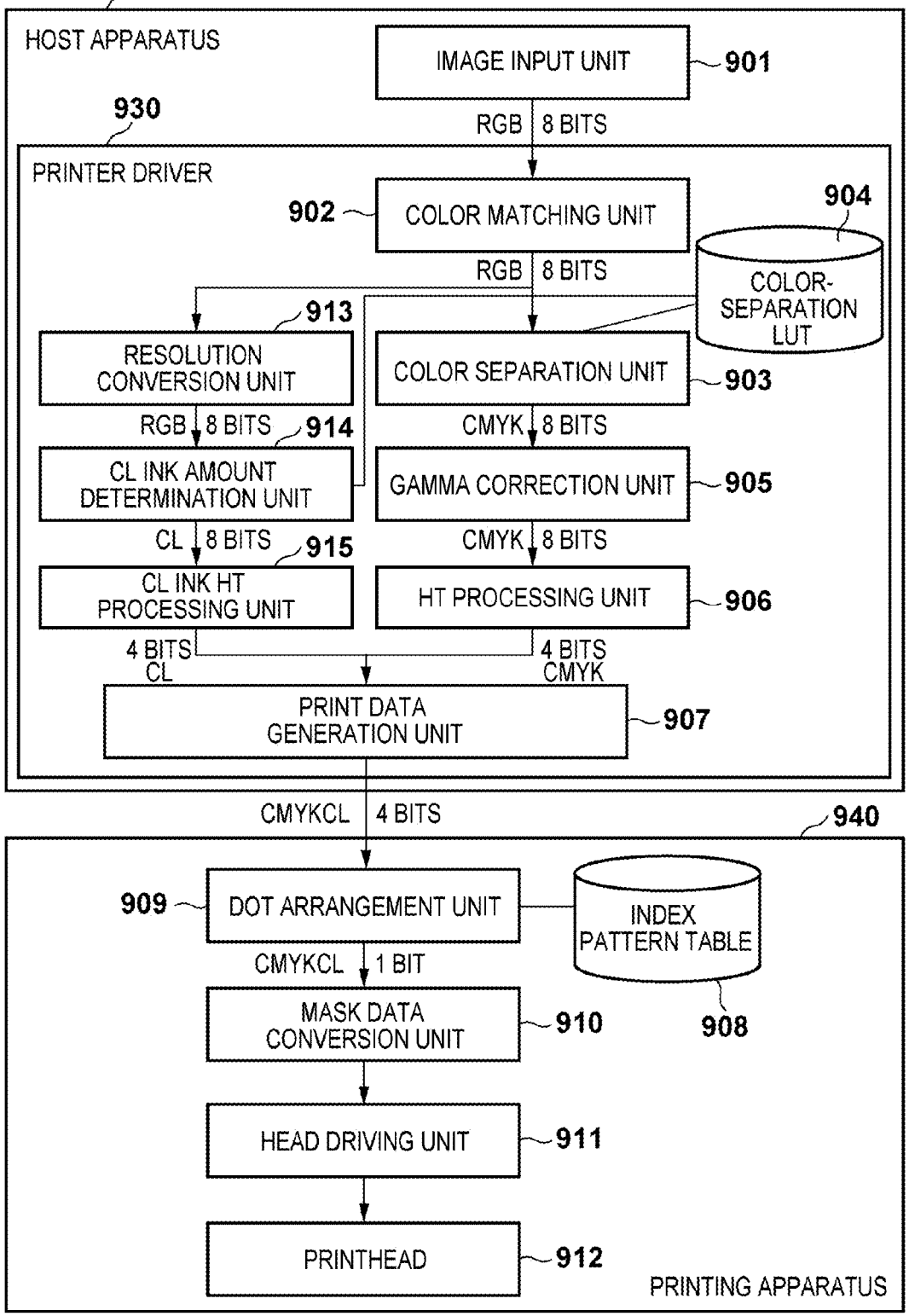
FIG. 17 is a block diagram for explaining the arrangement of an image processing apparatus according to the second embodiment.

The arrangement of the image processing apparatus of the second embodiment will be described below with reference to the block diagram shown in FIG. 17. A resolution conversion unit 913 reduces a resolution of image data (RGB values) after color matching to, for example, ½ to convert 2×2 pixels to one pixel. Note that the resolution conversion can use a bilinear method, bicubic method, nearest neighbor method, and the like.

A CL ink amount determination unit 914 obtains ink amounts of CMYK inks corresponding to RGB values input from the resolution conversion unit 913 with reference to a color-separation LUT 904. Next, the CL ink amount determination unit 914 determines a CL ink amount using formulas (7) and (8) based on the CMYK ink amounts as in the first embodiment. A CL ink HT processing unit 915 converts the input CL ink amount into a tone value of one of nine levels by error diffusion processing. A print data generation unit 907 outputs print data in the same manner as in the first embodiment. In this case, print image information includes CMYK image data and image data of a CL color material generated by reducing the resolution.

A dot arrangement unit 909 determines index patterns of the process color inks, and also dot placements of the CL ink based on the CL ink amount for each unit of 2×2 pixels.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-231883 filed Oct. 14, 2010 and 2011-213382 filed Sep. 28, 2011, which are hereby incorporated by reference herein in their entirety.

The invention claimed is:

1. An image processing apparatus for printing an image using a plurality of color materials and a colorless material, comprising:
    a memory which stores information indicating a plurality of predefined dot placements which include different dot placements to be printed using the colorless material and correspond to an amount of the colorless material;
    an inputting unit configured to input color material amount data indicating amounts of the plurality of color materials and the amount of the colorless material for each pixel;
    a first determiner configured to determine a dot placement to be printed using the colorless material from the plurality of predefined dot placements based on the amount of the colorless material indicated by the input color material amount data, wherein the dot placement to be determined has a high suppression effect of coloring of specular reflection light so that the coloring of specular reflection light on the pixel becomes closer to an achromatic color; and
    a printing unit configured to print the determined dot placement using the colorless material subsequent to the color materials having been printed, wherein the determined dot placement can overlap with dot placement printed using the color materials.

2. The apparatus according to claim 1, further comprising a second determiner configured to determine the dot placements of the plurality of color materials based on the amounts of the plurality of color materials indicated by the color material amount data for each pixel.

3. The apparatus according to claim 2, further comprising a third determiner configured to determine dot placements of the colorless material for a plurality of pixels by combining a first dot placement of the colorless material determined by the first determiner, and a second dot placement which is included in the plurality of predefined dot placements and is different from the first dot placement.

4. A method of printing an image using a plurality of color materials and a colorless material, comprising:
    using a processor to perform the steps of:
    storing information indicating a plurality of predefined dot placements, which include different dot placements to be printed using the colorless material and correspond to an amount of the colorless material, in a memory;
    inputting color material amount data indicating amounts of the plurality of color materials and the amount of the colorless material for each pixel;
    determining a dot placement to be printed using the colorless material from the plurality of predefined dot placements based on the amount of the colorless material indicated by the input color material amount data, wherein the dot placement to be determined has a high suppression effect of coloring of specular reflection light so that the coloring of specular reflection light on the pixel becomes closer to an achromatic color; and printing the determined dot placement using the colorless material subsequent to the color materials having been printed, wherein the determined placement can overlap with dot placement printed using the color materials.

5. A non-transitory computer readable medium storing a computer-executable program for causing a computer to carry out a method in accordance with claim 4.

* * * * *